UNITED STATES PATENT OFFICE.

ARTHUR HENRY STALAY HOLT, OF LUDWIGSHAFEN, GERMANY, ASSIGNOR TO THE BADISCHE ANILIN AND SODA FABRIK, OF SAME PLACE.

PROCESS OF MANUFACTURING INDIGO-LEUCO COMPOUNDS.

SPECIFICATION forming part of Letters Patent No. 643,502, dated February 13, 1900.

Application filed January 26, 1899. Serial No. 703,501. (No specimens.)

*To all whom it may concern:*

Be it known that I, ARTHUR HENRY STALAY HOLT, doctor of philosophy, a subject of the Queen of Great Britain and Ireland, residing at Ludwigshafen-on-the-Rhine, in the Kingdom of Bavaria and Empire of Germany, have invented new and useful Improvements in Processes for the Manufacture of Indigo-Leuco Compounds, of which the following is a specification.

I have discovered that certain polyhydric alcohols of the fatty series and certain other polyhydroxy compounds which are closely related to them, including certain ethers and derivatives of such bodies, all of which I hereinafter designate by the term "polyhydroxy compound of the fatty series," on melting together with an anthranilic-acid body—namely, anthranilic acid itself or its salts or esters—under suitable conditions yield leuco compounds of indigo. The leuco compounds so obtained can be oxidized to indigo in the usual way.

The hydroxylic compounds of the fatty series which are especially suited for the purposes of this invention are glycerin, alpha-chlor-hydrine, and also ordinary glycol, mannite, and various kinds of starch, and likewise cellulose and sawdust. Instead of the free hydroxyl compounds a similar result can be obtained when using them in the form of the metallic compounds thereof, such as calcium, sodium, or potassium glycerate. When the free hydroxy derivatives are used, an alkali is added to the melt; but if the metallic salts be used the reaction will proceed without the addition of an alkali as such. The alkalies which are preferably used are caustic potash and caustic soda, either singly or in admixture with one another. Also these are used in admixture with the alkaline earths, lime, or baryta, and the like. The leuco compound obtained can be oxidized to indigo in the usual way—for instance, by treating the alkaline solution of the melt with atmospheric air.

The following example will serve to illustrate the nature of my invention and the manner in which it can be best carried into practical effect. The parts are by weight.

*Example 1—Production of indigo from anthranilic acid by the aid of glycerin in the presence of an alkali.*—Mix one part of anthranilic acid (or the corresponding quantity of a salt of anthranilic acid) with two parts of glycerin and four parts of caustic potash. Heat the mixture rapidly to a temperature of about from 250° to 300° centigrade. Maintain this temperature until the melt assumes a yellow-red to brown-red color. During the melting operation the melt becomes blown up with bubbles. Allow the melt to cool and dissolve it in water and separate the indigo in any well-known or suitable way.

*Example 2—Production of indigo from potassium salt of anthranilic acid by the aid of potassium glycerate and no further alkali.*—Mix together about one part of potassium salt of anthranilic acid and about three parts of potassium glycerate, thoroughly dried. Heat this mixture to a temperature of about 270° centigrade until the generation of gas from the melt ceases and the melt has assumed a yellow-red color. Work up as described in Example 1.

*Example 3—Production of indigo from the potassium salt of anthranilic acid by the aid of potassium glycerate and a mixture of caustic potash and lime.*—Mix together one part of the potassium salt of anthranilic acid, two parts of potassium glycerate, two parts of caustic potash, and four parts of caustic lime, and heat the mixture at a temperature of 270° to 290° centigrade until the mass is a light-yellow color. The reaction goes on quietly without any considerable bubbling up. Allow the melt to cool and dissolve it in water, preventing as far as possible contact with air. Filter off the lime and pass a stream of air through the solution until all the indigo is separated out. Collect and filter, wash with water, and then with hydrochloric acid, and finally with water, and then dry.

In the foregoing examples epi-chlorhydrin or acetin can in each case be used instead of the glycerin, and instead of the potassium salt of anthranilic acid the equivalent quantity of the ethyl-ester of anthranilic acid can be used.

*Example 4—Production of indigo from anthranilic acid by means of ethylene-glycol.*—Mix together about three parts of the potassium salt of anthranilic acid or the same quantity of the ethyl-ester of anthranilic acid in about six parts of caustic potash, and to this mixture add about two parts of ethyleneglycol. Mix the mass thoroughly and heat quickly to a temperature of about 300° centigrade, which can be done, for instance, by inserting the vessel containing the mixed materials into a hot metallic bath. When the evolution of gas has ceased and the melt has assumed a light-yellow color, the reaction may be regarded as ended. Allow the melt to cool. Dissolve it in water and precipitate and collect the indigo in the well-known or any suitable way.

*Example 5—Production of indigo from potassium salt of anthranilic acid by the aid of mannite.*—Prepare a mixture of one part of mannite and one part of the salt of anthranilic acid and four parts of caustic potash and heat this mixture quickly to a temperature of from about 290° to 300° centigrade, while excluding the air as far as possible. The mass bubbles up. Continue heating until the color of the melt has changed from brown-red to yellow-red and evolution of the gas has ceased. Allow the melt to cool, dissolve it in water, and precipitate and collect the indigo in the well-known way. In this example starch can be used instead of mannite—for instance, wheat-starch or pure soluble starch—or cellulose can be used—for instance, in the form of cotton-wool or in the form of the finest dried saw-dust—and instead of the potassium salt of anthranilic acid the free acid can be used or its ethyl-ester.

The instances of the polyhydric bodies of the fatty series and the derivatives thereof, hereinbefore mentioned, will serve to indicate the wide range of bodies that can be used to produce indigo by means of anthranilic acid and its analogues herein defined in accordance with this invention.

Now what I claim is—

1. The process for the production of indigo-leuco compounds, which consists in melting together a hereinbefore-defined polyhydroxy compound of the fatty series with an anthranilic-acid body, substantially as described.

2. The process for the production of indigo-leuco compounds, which consists in melting together a hereinbefore-defined polyhydroxy compound of the fatty series with an anthranilic-acid body, and an alkali, substantially as described.

3. Process for the production of indigo-leuco compounds by melting together an anthranilic-acid body, glycerin, and caustic potash, substantially as herein described.

4. Process for the production of indigo-leuco compounds by melting together potassium salt of anthranilic acid and potassium glycerate, substantially as described.

5. Process for the production of indigo-leuco compounds by melting together the potassium salt of anthranilic acid, potassium glycerate, and a mixture of caustic potash and lime, all substantially as described.

In testimony whereof I have hereunto set my hand in the presence of two subscribing witnesses.

ARTHUR HENRY STALAY HOLT.

Witnesses:
 HOWARD E. J. INGLEY,
 ERNEST F. EHRHARDT.